United States Patent
Yu

(10) Patent No.: US 10,547,401 B2
(45) Date of Patent: Jan. 28, 2020

(54) MANAGING TIME CONSISTENCY IN A DISTRIBUTED COMPUTING SYSTEM

(71) Applicant: Alibaba Group Holding Limited, George Town (KY)

(72) Inventor: Jing Yu, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 22 days.

(21) Appl. No.: 15/784,912

(22) Filed: Oct. 16, 2017

(65) Prior Publication Data

US 2018/0041298 A1 Feb. 8, 2018

Related U.S. Application Data

(63) Continuation of application No. PCT/CN2016/077303, filed on Mar. 25, 2016.

(30) Foreign Application Priority Data

Apr. 17, 2015 (CN) .......................... 2015 1 0183965

(51) Int. Cl.
| | |
|---|---|
| H04J 3/06 | (2006.01) |
| H04L 29/08 | (2006.01) |
| G06F 1/14 | (2006.01) |
| G06Q 40/00 | (2012.01) |
| G06F 1/12 | (2006.01) |
| G06Q 40/02 | (2012.01) |

(52) U.S. Cl.
CPC ............ *H04J 3/0658* (2013.01); *H04L 67/10* (2013.01); *G06Q 40/02* (2013.01)

(58) Field of Classification Search
None
See application file for complete search history.

(56) References Cited

U.S. PATENT DOCUMENTS 5,790,805 A * 8/1998 Bantum ............... H04J 3/0667
 709/248
6,446,092 B1 * 9/2002 Sutter .................. G06F 21/6227
(Continued)

FOREIGN PATENT DOCUMENTS

| CN | 101493826 | 7/2009 |
| CN | 102238719 | 11/2011 |

(Continued)

OTHER PUBLICATIONS

International Search Report of the International Searching Authority issued in International Application No. PCT/CN2016/077303 dated Jun. 28, 2016; 11 pages.

(Continued)

*Primary Examiner* — Philip J Chea
*Assistant Examiner* — Hassan A Khan
(74) *Attorney, Agent, or Firm* — Fish & Richardson P.C.

(57) ABSTRACT

A computer-implemented method of managing time consistency in a distributed computing system includes adjusting a time of a first server in the distributed computing system to a target time. The first server identifies a time offset between the target time and a time of a second server in the distributed computing system. The first server generates a computer instruction to the second server, where the computer instruction includes a time function modified by the time offset.

20 Claims, 5 Drawing Sheets

(56) References Cited

U.S. PATENT DOCUMENTS

| | | | |
|---|---|---|---|
| 2006/0194573 A1* | 8/2006 | Akiyama | H04L 63/0823 455/414.3 |
| 2008/0263105 A1* | 10/2008 | Nakamura | H04L 43/0817 |
| 2014/0277592 A1 | 9/2014 | Crater et al. | |
| 2015/0156262 A1* | 6/2015 | Alves | H04L 69/28 709/201 |

FOREIGN PATENT DOCUMENTS

| | | |
|---|---|---|
| CN | 102693324 | 9/2012 |
| CN | 103116544 | 5/2013 |
| CN | 103763055 | 4/2014 |
| CN | 103763142 | 4/2014 |
| CN | 104202204 | 12/2014 |
| CN | 104243515 | 12/2014 |
| EP | 934568 | 8/1999 |
| EP | 0934568 | 8/1999 |
| WO | WO 199820430 | 5/1998 |

OTHER PUBLICATIONS

Extended European Search Report issued in EP Application No. 16779519.4 dated Sep. 19, 2018; 7 pages.

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

* cited by examiner

MANAGING TIME CONSISTENCY IN A DISTRIBUTED COMPUTING SYSTEM

This application is a continuation of PCT Application No. PCT/CN2016/077303 filed on Mar. 25, 2016, which claims priority to Chinese Patent Application No. 201510183965.3, filed on Apr. 17, 2015, the entire contents of each are hereby incorporated by reference.

BACKGROUND

A distributed computing system, such as a cloud computing system, can include multiple computers that work together to perform tasks. For example, a distributed computing system can include application servers and database servers that communicate with each other to provide services.

SUMMARY

The present disclosure describes managing time consistency in a distributed computing system.

In an implementation, a time of a first server in a distributed computing system is adjusted to a target time. The first server identifies a time offset between the target time and a time of a second server in the distributed computing system. The first server generates a computer instruction to the second server, where the computer instruction includes a time function modified by the time offset.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, the described approach enables a simulation of a service at a future time in a distributed computing system, such as a cloud computing system. For example, the described approach can be used to simulate a financial service that predicts a user account status at a future time. Second, the described approach provides time consistency in the distributed computing system by modifying application server times in the distributed computing system. Third, for reducing failures of database servers in the distributed computing system, the described approach enables the service simulation to generate database records at the future time without modifying database server times and without modifying software codes on the database servers. Fourth, the described approach archives time consistency with minimum software code changes on the application servers. Other advantages will be apparent to those of ordinary skill in the art.

The details of one or more implementations of the subject matter of this specification are set forth in the Detailed Description, the Claims, and the accompanying drawings. Other features, aspects, and advantages of the subject matter will become apparent from the Detailed Description, the Claims, and the accompanying drawings.

DESCRIPTION OF DRAWINGS

Like reference numbers and designations in the various drawings indicate like elements.

DETAILED DESCRIPTION

Figure 1:
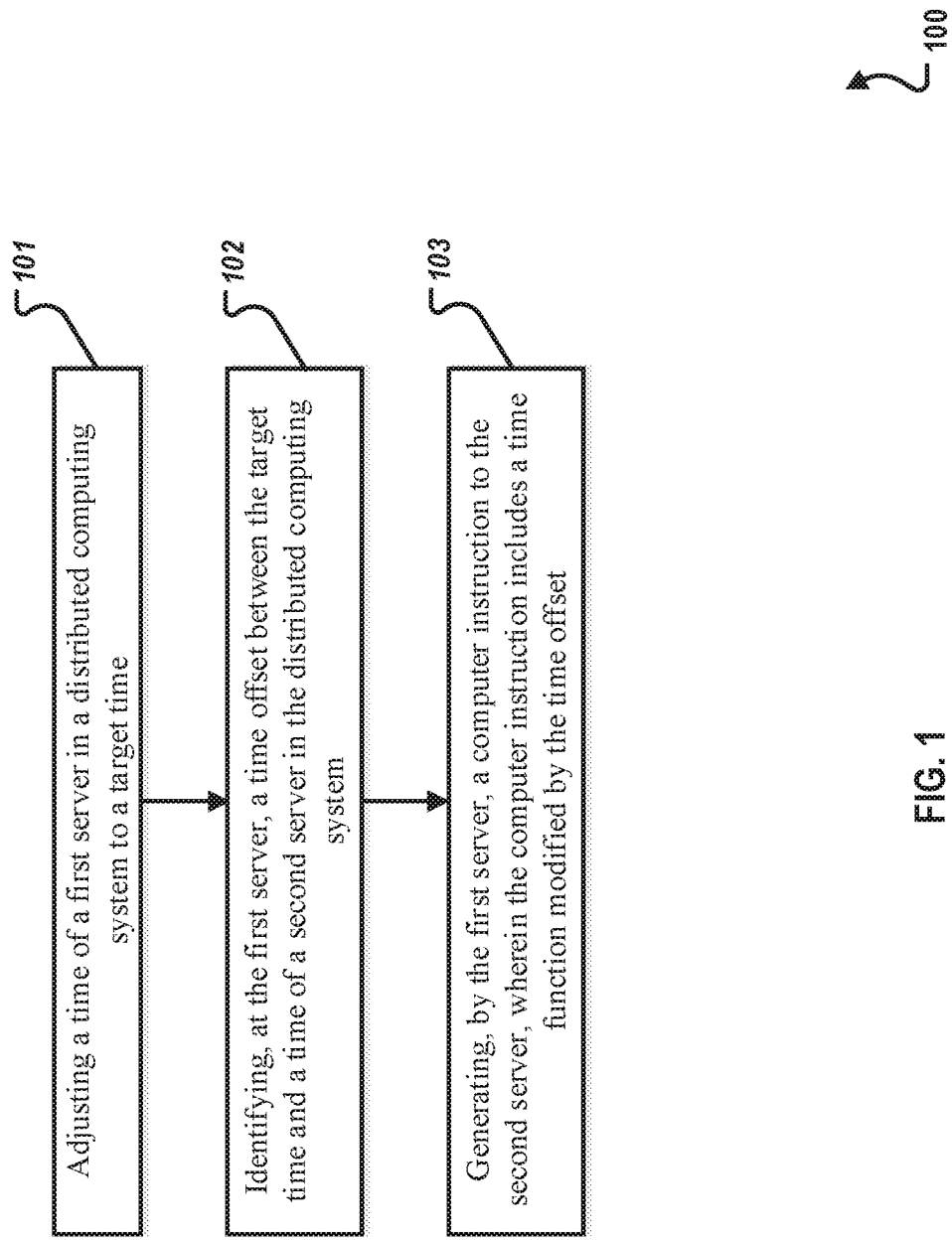
FIG. 1 is a flowchart illustrating a first example of a method for managing time consistency in a distributed computing system, according to an implementation of the present disclosure.

The following detailed description describes managing time consistency in a distributed computing system, and is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined can be applied to other implementations and applications, without departing from the scope of the present disclosure. In some instances, details unnecessary to obtain an understanding of the described subject matter can be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

A distributed computing system, such as a cloud computing system, can include multiple computers that work together to perform tasks. The distributed computing system can include one or more application servers and one or more database servers. The application servers can provide services to end users or other applications by retrieving data from or writing data to the database servers. In some cases, the application servers and the database servers may not have a common time, and modifying a time of a database server can lead to database failures. As a result, the distributed computing system may not provide services appropriately due to the unsynchronized times of different servers. For example, an end user can request the distributed computing system to simulate a service at a future time, such as simulating a bank loan service that predicts a user account status at a future time. The service simulation involves both the application servers and the database servers. The unsynchronized times of the database servers and the application servers can create inconsistency between a service time (the future time of the simulated service) and an accounting time (a time of a database record), which leads to a failure of the service simulation. In other words, the service simulation may generate database records that are not associated with the service time.

At a high level, the described approach manages time consistency in a distributed computing system by modifying times of application servers but without modifying times of database servers. In typical implementations, the time of a computer server is considered to be the system time of the computer server. During a service simulation, times of the application servers involved in the service simulation are synchronized to a target time. When an application server sends a database operation instruction to a database server, the database operation instruction is modified to include a time offset between the target time and the time of the database server so that the database server is effectively synchronized with the target time without actually modifying the time of the database server. Although the description in this disclosure describes a simulated service at a future time, as understood by one of ordinary skill in the art, the described approach can also be used for performing other tasks in a distributed computing system that includes multiple computers with different times. The described approach can be used for simulating services at a past time or a current time.

FIG. 1 is a flowchart illustrating a first example of a method 100 for managing time consistency in a distributed computing system, according to an implementation of the present disclosure. For clarity of presentation, the description that follows generally describes method 100 in the context of the other figures in this description. However, it will be understood that method 100 can be performed, for example, by any system, environment, software, and hardware, or a combination of systems, environments, software, and hardware, as appropriate. In some implementations, various steps of method 100 can be run in parallel, in combination, in loops, or in any order.

In some cases, for checking security of a user account in a financial distributed computing system, a service can be simulated at a preset time (which is typically a time in the future) to operate the user account for predicting a state of the user account at the future preset time. For example, a user has a one-year loan of 12 payments. If the user has an early payoff for the second payment, a service simulation can be performed to make sure that the interest calculation is correct for the remaining future payments. In some implementations, as will be shown in FIG. 3, the simulated service can be launched by an application hosted on a computer outside the distributed computing system. The application launching the service simulation can perform operations on application servers in the distributed computing system, and the application servers can further perform operations on database servers in the distributed computing system.

At 101, an application server adjusts its own time to a target time. For example, the target time can be the future time associated with the simulated service. The target time can be specified by a user or the application launching the service simulation. In some implementations, when performing the service simulation, the application servers and the database servers related to the service simulation are identified. For example, when performing a loan service simulation, the application servers involved in the loan service and the corresponding database servers are identified, and the times of the identified application servers are synchronized to the target time.

In some implementations, one application server from the identified application servers can be selected as a time server. The time of the time server is adjusted to the target time, and the remaining identified application servers are time-synchronized with the time server by taking the time of the time server as a reference. In some cases, due to hardware differences between servers, as time elapses, an application server may not be time-synchronized with the time server after an initial synchronization, and the application server can perform time re-synchronization with the time server. For example, the application server can periodically (for example, every 10 minutes) query the time server for a time of the time server. In some cases, the time server can periodically broadcast its time to other application servers.

In some implementations, time synchronization of the application servers can be implemented without selecting an application server as a time server. For example, the application launching the service simulation can directly send an instruction or a script to each application server and adjust the server time to the target time. From 101, method 100 proceeds to 102.

At 102, the application server identifies a time offset between the target time and a time of a database server in the distributed computing system. In some cases, the time offset can be calculated by the time server or the application launching the service simulation. The time server or the application launching the service simulation can acquire the time of the database server, for example, through an instruction or a script to the database server. For instance, the time of the database server can be acquired by sending the following SQL instruction to the database server: SELECT NOW( ) FROM DUAL. In SQL, NOW( ) is a database time function. The time server or the application launching the service simulation can calculate the time offset by subtracting the time of the database server from the target time. The calculated time offset are sent to the application servers so that the application servers can include the time offset in database operation instructions to the database server. From 102, method 100 proceeds to 103.

At 103, the application server generates a database operation instruction to perform an operation on the database server, where the instruction includes a time function modified by the time offset. A time function is a database function that performs an operation on a time. In some cases, the database operation instructions generated by the application server may include multiple time functions. The application server can identify the time functions that are related to the service simulation, and modify or replace these identified time functions using the time offset. Modifying a time function can include inserting the time offset in the time function of the database operation instruction to generate a modified time. As a result, time consistency between the database server and the application server is achieved without modifying the time of the database server. After 103, method 100 stops.

Figure 2:
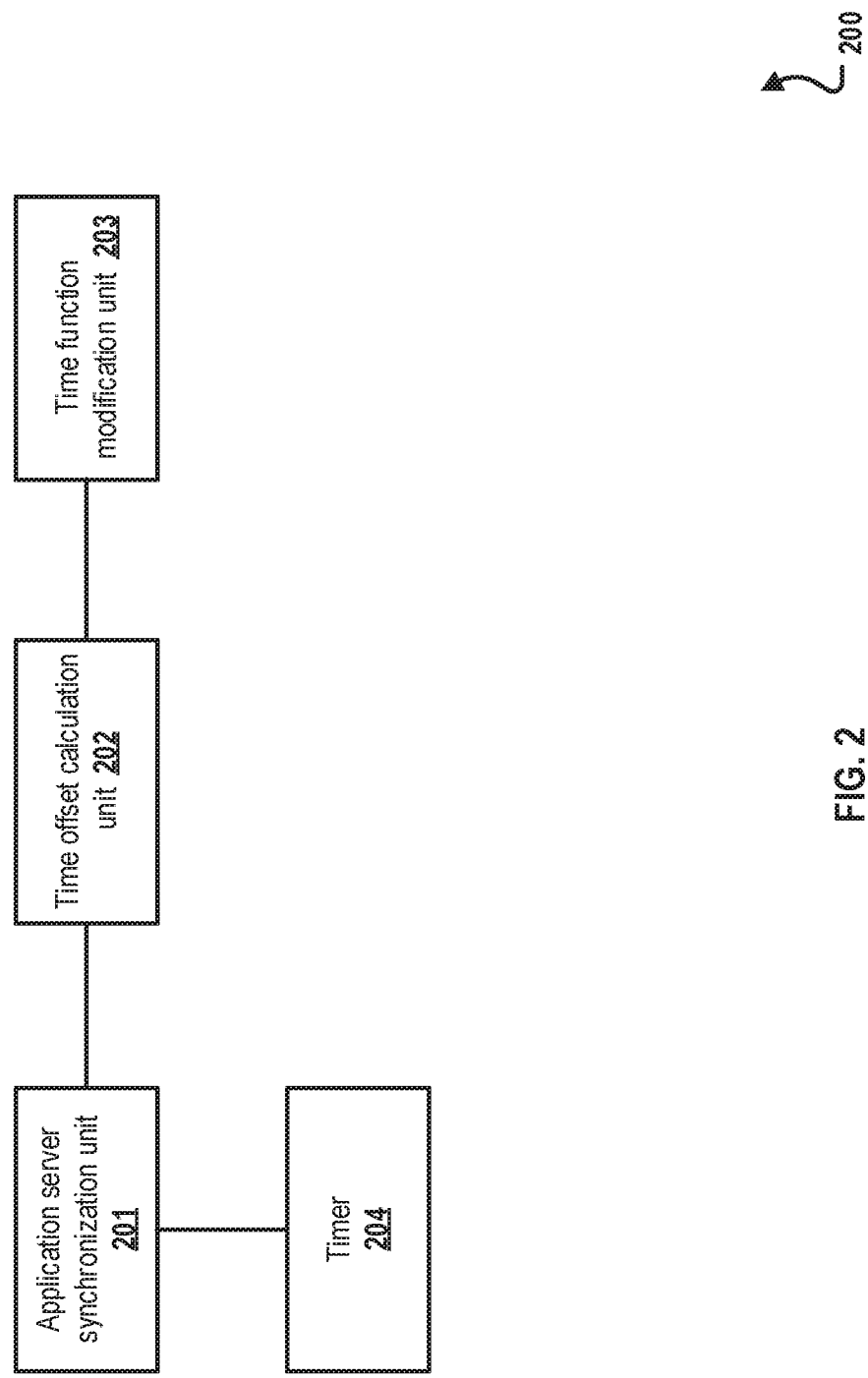
FIG. 2 is a block diagram illustrating an example of an apparatus for managing time consistency in a distributed computing system, according to an implementation of the present disclosure.

FIG. 2 is a block diagram illustrating an example of an apparatus 200 for managing time consistency in a distributed computing system, according to an implementation of the present disclosure. For example, apparatus 200 can be used to implement method 100 in FIG. 1. The apparatus 200 can include software modules or hardware logic circuits that implement corresponding functions. Functions of the apparatus 200 can be implemented in one or more application servers or one or more separate computers different than the application servers and the database servers. For example, one function of the apparatus 200 can be implemented in one application server, and another function of the apparatus 200 can be implemented in another server. The apparatus 200 can be implemented in related servers in the distributed computing system in a form of a functional unit or module, or an underlying framework structure of a server. The apparatus 200 can include an application server synchronization unit 201, a time offset calculation unit 202, a time function modification unit 203, and a timer 204.

The application server synchronization unit 201 is configured to synchronize times of application servers according to a target time. In some implementations, the application server synchronization unit 201 is further configured to select one application server as a time server, adjust a time of the time server to the target time, and synchronize times of the remaining application servers with the time of the time server by taking the time of the time server as a reference. In some implementations, the timer 204 is configured to periodically provide time indications to the application server synchronization unit 201 (for example, provide an indication every 10 minutes) so that times of the remaining application servers can periodically re-synchronize with the time of the time server after the initial time synchronization. In some implementations, the timer 204 can provide time indications to the application server synchronization unit 201 on a non-periodic (for example, a continual or irregular/sporadic) basis.

The time offset calculation unit 202 is configured to determine, through calculation, a time offset between the target time and a time of a database server, and send the time offset to the application servers. In some implementations, the time offset calculation unit 202 is further configured to acquire the time of the database server, subtract the time of the database server from the target time to obtain the time offset, and send the time offset to the application servers.

The time function modification unit 203 is configured to modify, based on the time offset, time functions in database operation instructions generated by the application servers.

Figure 3:
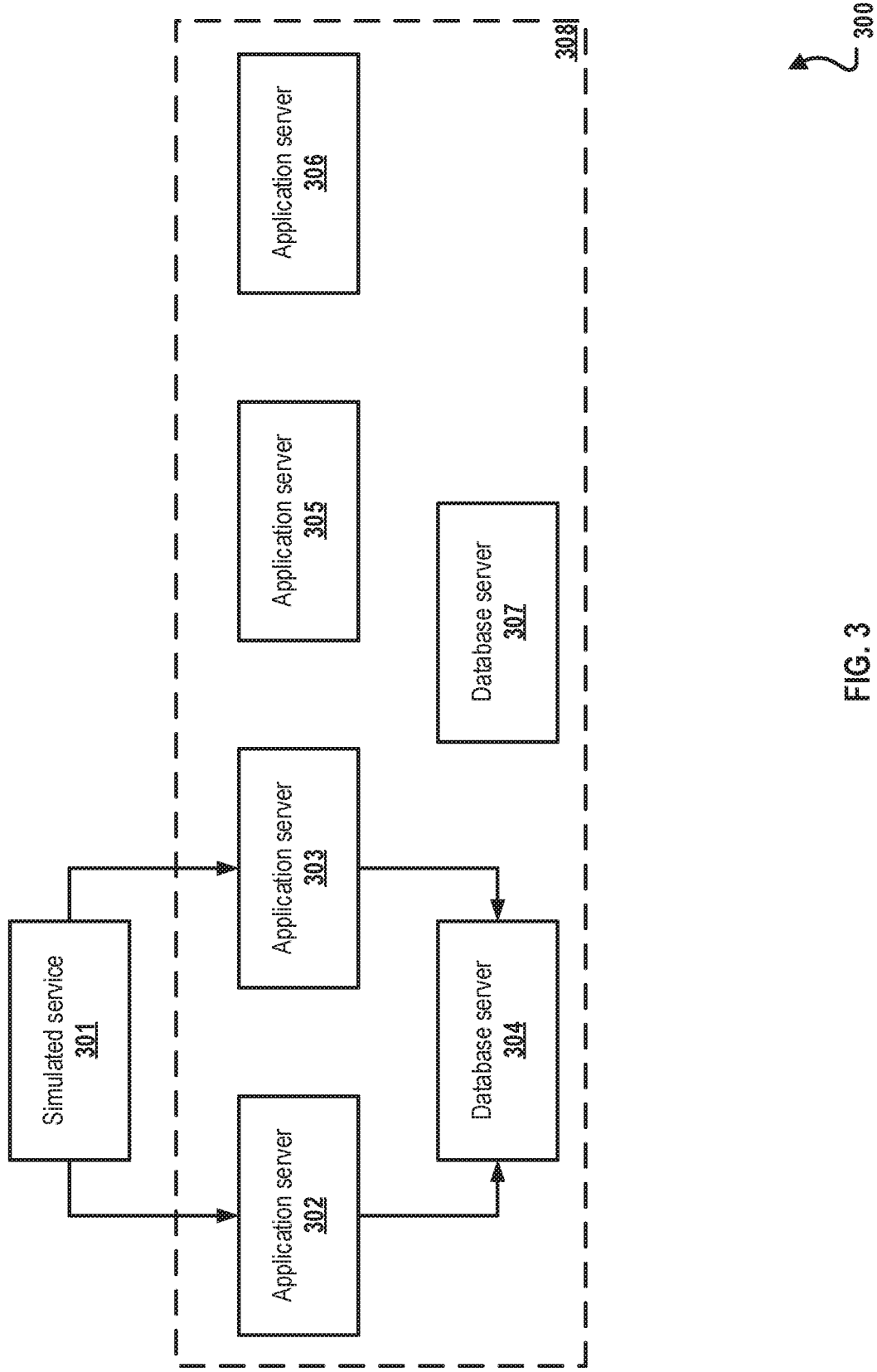
FIG. 3 is a block diagram illustrating an example of a service simulation system including a distributed computing system, according to an implementation of the present disclosure.

FIG. 3 is a block diagram illustrating an example of a service simulation system 300 including a distributed computing system, according to an implementation of the present disclosure. The service simulation system 300 includes a simulated service 301 and a distributed computing system 308 performing the simulated service 301. The simulated service 301 can be launched by an application hosted on a computer outside the distributed computing system 308. The distributed computing system 308 includes application servers 302, 303, 305, and 306, and database servers 304 and 307. The simulated service 301 uses the application servers 302 and 302 and the database server 304, while the application servers 305 and 306 and the database server 307 are irrelevant to the simulated service 301. The application server 302 is selected as a time server to serve as a time reference for the application server 303 during the execution of the simulated service 301.

Figure 4:
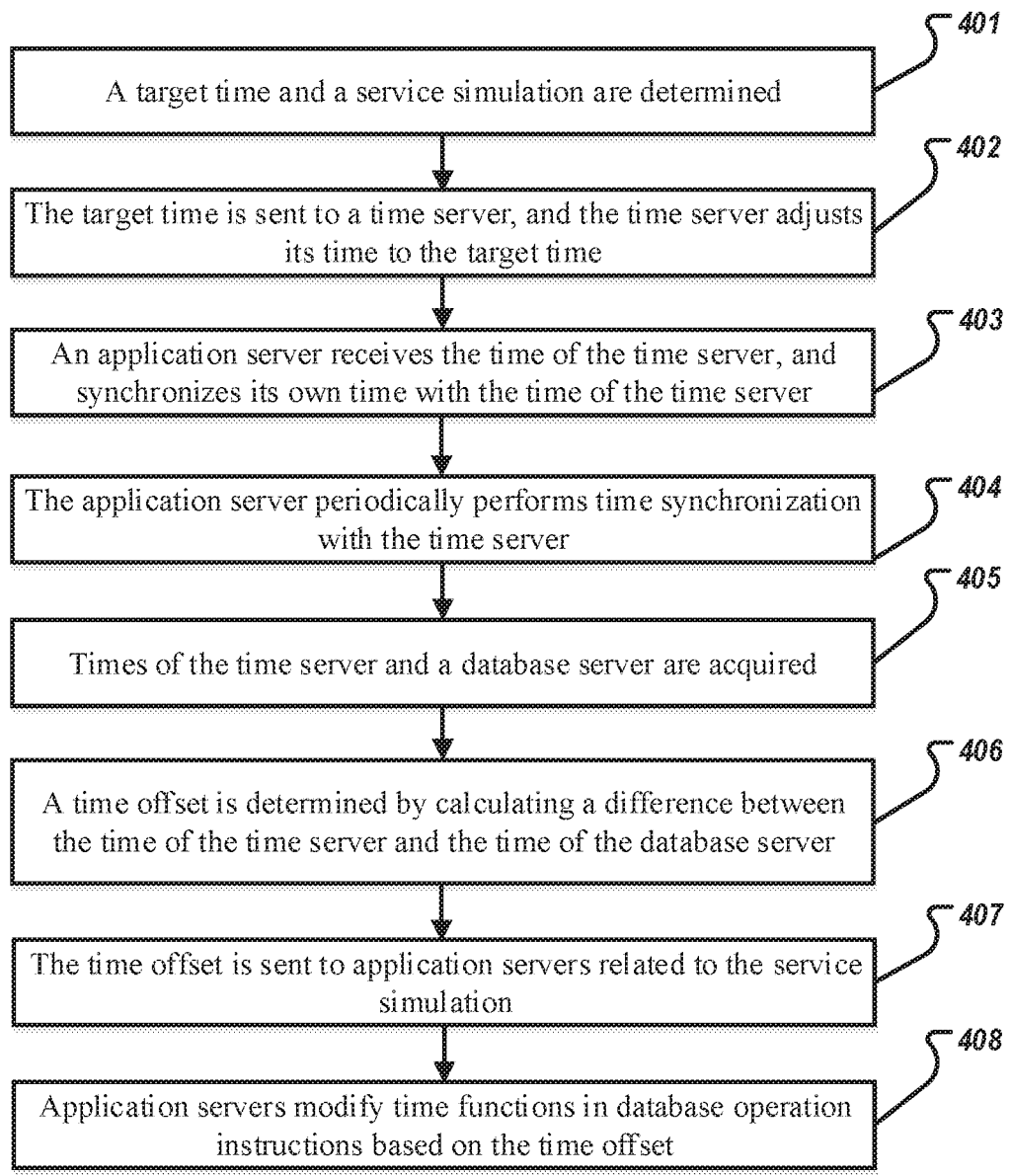
FIG. 4 is a flowchart illustrating a second example of a method for managing time consistency in a distributed computing system, according to an implementation of the present disclosure.

FIG. 4 is a flowchart illustrating a second example of a method 400 for managing time consistency in a distributed computing system, according to an implementation of the present disclosure. The service simulation system 300 in FIG. 3 is used to implement method 400. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

For example, the simulated service 301 requests a simulation of a service at a future time, for instance, 15:30 on Oct. 2, 2017. In other words, the target time is considered to be 15:30 on Oct. 2, 2017. The simulated service 301 adds new bank interest data to the database server 304. Assume that the time of the application server 302 is 15:30 on Oct. 1, 2017, the time of the application server 303 is 15:32 on Oct. 1, 2017, and the time of the database server 304 is 15:33 on Oct. 1, 2017. Note that the simulated service time, 15:30 on Oct. 2, 2017, is a future time with respect to the times of the application servers 302 and 303 and the time of the database server 304.

At 401, the target time and the simulated service are determined. For example, using an input device such as a mouse or a keyboard, a user can input a name of the simulated service and the target time. The user can also input a list of related application servers and database servers that will be used in the service simulation. The user can input these information using a command-line interface or an interface of the application launching the service simulation. In some cases, the application launching the service simulation can determine the target time, the list of related application servers and database servers, or both. The application launching the service simulation can be in a computer different than the application servers and the database servers. For the example of the simulated service 301, the related application servers are the application servers 302 and 303, and the related database server is the database server 304. The application server 302 is selected as the time server. From 401, method 400 proceeds to 402.

At 402, the target time is sent to the time server, and the time server adjusts its own time to the target time. For example, the application launching the simulated service 301 can send the target time to the time server. For example, the application server 302 adjusts its time to 15:30 on Oct. 2, 2017. From 402, method 400 proceeds to 403.

At 403, the remaining application servers (the application servers not served as the time server) receive a time of the time server, and synchronize their times with the time of the time server. For example, the application server 303 can acquire the time of the time server to perform time synchronization. In some cases, the time server can also send a time synchronization instruction, including the time of the time server, to the application server 303 and instruct the application server 303 to perform time synchronization. For instance, the application server 303 modifies its own time to the time of the time server, that is, 15:30 on Oct. 2, 2017. From 403, method 400 proceeds to 404.

At 404, the remaining application servers periodically perform time synchronization with the time server. For example, the application server 303 can determine a time interval. Each time the time interval elapses, the application server 303 sends a message to the time server to acquire the time of the time server and perform time synchronization. In some cases, the time server determines a time interval. Each time the time interval elapses, the time server sends a synchronization instruction, including the time of the time server, to the application server 303 and instructs the application server 303 to perform time synchronization. For example, the application server 303 is initially synchronized to 15:30 on Oct. 2, 2017. After 10 minutes, the time of the time server is 15:40 on Oct. 2, 2017, while the time of the application server 303 is 15:41 on Oct. 2, 2017 (for example, the time difference can be due to hardware differences in the servers). The application server 303 can re-synchronize with the time server and modify its time to 15:40 on Oct. 2, 2017. From 404, method 400 proceeds to 405.

At 405, the time of the time server and the time of a database server are acquired. For example, the time of the database server 304 can be acquired by sending a time acquisition instruction to the database server 304, for example, a database instruction SELECT NOW( ) FROM DUAL. As previously described, the time of the database server 304 is 15:33 on Oct. 1, 2017, and the time of the time server is 15:30 on Oct. 2, 2017. From 405, method 400 proceeds to 406.

At 406, a time offset is determined by calculating a difference between the time of the time server and the time of the database server. For example, as described previously, the time of the time server is 15:30 on Oct. 2, 2017, and the time of the database server is 15:33 on Oct. 1, 2017. As a result, the time offset is determined to be 23 hours and 57 minutes. From 406, method 400 proceeds to 407.

At 407, the time offset is sent to the application servers related to the service simulation. In some implementations, the time offset is sent to the related application servers in a multi-thread manner. In the example of FIG. 3, only the application servers 302 and 303 are the related application servers, and the application server 302 is a time server. If the time offset is calculated by the time server, the time server can include the time offset in a thread and push to the application server 303. If the simulated service 301 is further related to other application servers, the time offset can be pushed to all the related application servers at the same time in a multi-thread way. The application servers related to the simulated service include application servers in the distributed computing system whose service times need to rely on the times of the database servers. In a typical implementation, steps 405 to 407 are performed by the time server. Steps 405 to 407 can also be performed by a separate device different than the time server, or an application server that is not served as a time server (for example, the application server 303). From 407, method 400 proceeds to 408.

At 408, the application servers generate database operation instructions and modify time functions in the database operation instructions based on the time offset. For example, the simulation service 301 can be a bank loan service, where the loan can produce interest every day. The application server 303 can generate a database operation instruction to add an interest bearing record to the database server 304. The database operation instruction includes a time function of interest bearing, for example, SELECT NOW( ) FROM DUAL. The time function NOW( ) in the database operation instruction can be modified by the time offset so that the modified database operation instruction becomes SELECT DATE_ADD(NOW( ), INTERVAL '23:57' HOUR_ MINUTE) FROM DUAL, where NOW( ) is the function of acquiring the time of the database server, INTERVAL '23:57' HOUR_MINUTE is the time offset, DATE_ADD( ) is a function of adding the time offset to the time of the database server, and DUAL is a database table. Therefore, the service can be simulated at any desired time by introducing a time offset. The application server can determine which time function needs to be modified based on the name of the time function. For example, time functions of OB and MYSQL such as NOW( ), CURRENT_TIME( ), CURRENT_TIMESTAMP( ), STRICT_CURRENT_TIMESTAMP( ) can be modified by a time offset. By modifying the database operation instructions with a time offset, a service time recorded in the database can be synchronized with the time of the application server without changing the time of the database server, which ensures time consistency during the simulation of a service. After 408, method 400 stops.

In some implementations, multiple database servers and multiple application servers are involved in the service simulation. An application server may perform operations with multiple database servers, and each database server can have a different time. In this scenario, in step 405, times of all the database servers and the time of the time server are acquired. In step 406, multiple time offsets are determined by calculating a time difference between the time server and each database server. A mapping between a time offset and the corresponding database server can be recorded. In step 407, the multiple time offsets are sent to the application servers. In some cases, the multiple time offsets are sent to each application server. In some cases, an application server performs operations with a subset of database servers, and the time offsets corresponding to the subset of the database servers are sent to that application server. In step 408, an application server can send database operation instructions to different database servers, and the time functions in the database operation instructions sent to the different database servers are modified differently based on the corresponding time offsets. For example, an application server performs operations with database servers A and B. The time offset between the target time and the time of the database server A is $T_A$, and the time offset between the target time and the time of the database server B $T_B$. The time offsets $T_A$ and $T_B$ are sent to the application server. The application server modifies the time functions in the database operation instructions sent to the database server A by $T_A$, and modifies the time functions in the database operation instructions sent to the database server B by $T_B$.

Figure 5:
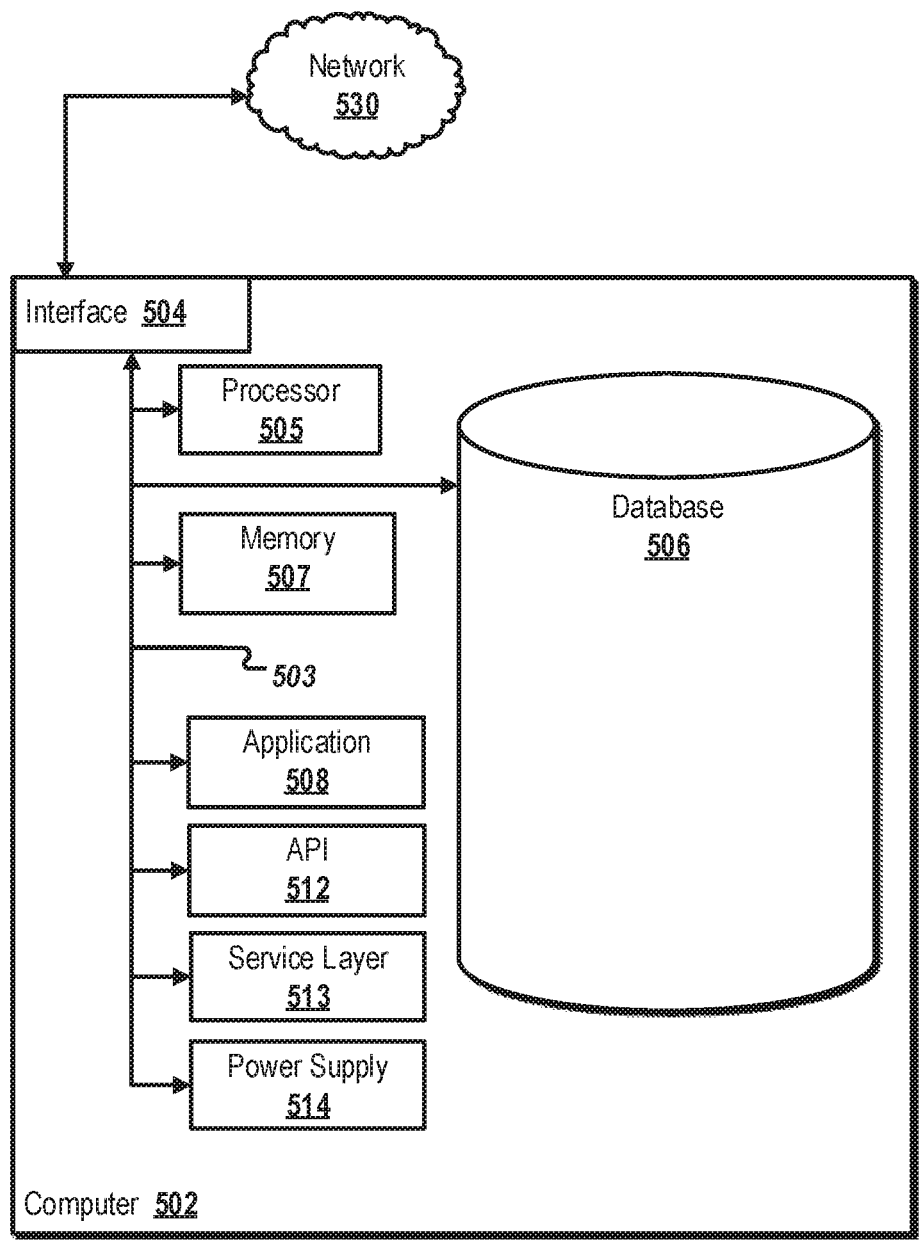
FIG. 5 is a block diagram illustrating an example of a computer-implemented system used to provide computational functionalities associated with described algorithms, methods, functions, processes, flows, and procedures, according to an implementation of the present disclosure.

FIG. 5 is a block diagram illustrating an example of a computer-implemented system 500 used to provide computational functionalities associated with described algorithms, methods, functions, processes, flows, and procedures, according to an implementation of the present disclosure. The illustrated computer 502 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 502 can comprise a computer that includes an input device, such as a keypad, keyboard, touch screen, another input device, or a combination of input devices that can accept user information, and an output device that conveys information associated with the operation of the computer 502, including digital data, visual, audio, another type of information, or a combination of types of information, on a graphical-type user interface (UI) (or GUI) or other UI.

The computer 502 can serve in a role in a distributed computing system as a client, network component, a server, a database or another persistency, another role, or a combination of roles for performing the subject matter described in the present disclosure. The illustrated computer 502 is communicably coupled with a network 530. In some implementations, one or more components of the computer 502 can be configured to operate within an environment, including cloud-computing-based, local, global, another environment, or a combination of environments.

At a high level, the computer 502 is an electronic computing device operable to receive, transmit, process, store, or manage data and information associated with the described subject matter. According to some implementations, the computer 502 can also include or be communicably coupled with a server, including an application server, e-mail server, web server, caching server, streaming data server, another server, or a combination of servers.

The computer 502 can receive requests over network 530 (for example, from a client software application executing on another computer 502) and respond to the received requests by processing the received requests using a software application or a combination of software applications. In addition, requests can also be sent to the computer 502 from internal users (for example, from a command console or by another internal access method), external or third-parties, or other entities, individuals, systems, or computers.

Each of the components of the computer 502 can communicate using a system bus 503. In some implementations, any or all of the components of the computer 502, including hardware, software, or a combination of hardware and software, can interface over the system bus 503 using an application programming interface (API) 512, a service layer 513, or a combination of the API 512 and service layer 513. The API 512 can include specifications for routines, data structures, and object classes. The API 512 can be either computer-language independent or dependent and refer to a complete interface, a single function, or even a set of APIs. The service layer 513 provides software services to the computer 502 or other components (whether illustrated or not) that are communicably coupled to the computer 502. The functionality of the computer 502 can be accessible for all service consumers using this service layer. Software services, such as those provided by the service layer 513, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 502, alternative implementations can illustrate the API 512 or the service layer 513 as stand-alone components in relation to other components of the computer 502 or other components (whether illustrated or not) that are communicably coupled to the computer 502. Moreover, any or all parts of the API 512 or the service layer 513 can be implemented as a child or a sub-module of another software module, enterprise application, or hardware module without departing from the scope of the present disclosure.

The computer 502 includes an interface 504. Although illustrated as a single interface 504 in FIG. 5, two or more interfaces 504 can be used according to particular needs, desires, or particular implementations of the computer 502. The interface 504 is used by the computer 502 for communicating with another computing system (whether illustrated or not) that is communicatively linked to the network 530 in a distributed environment. Generally, the interface 504 is operable to communicate with the network 530 and comprises logic encoded in software, hardware, or a combination of software and hardware. More specifically, the interface 504 can comprise software supporting one or more communication protocols associated with communications such that the network 530 or interface's hardware is operable to communicate physical signals within and outside of the illustrated computer 502.

The computer 502 includes a processor 505. Although illustrated as a single processor 505 in FIG. 5, two or more processors can be used according to particular needs, desires, or particular implementations of the computer 502. Generally, the processor 505 executes instructions and manipulates data to perform the operations of the computer 502 and any algorithms, methods, functions, processes, flows, and procedures as described in the present disclosure.

The computer 502 also includes a database 506 that can hold data for the computer 502, another component communicatively linked to the network 530 (whether illustrated or not), or a combination of the computer 502 and another component. For example, database 506 can be an in-memory, conventional, or another type of database storing data consistent with the present disclosure. In some implementations, database 506 can be a combination of two or more different database types (for example, a hybrid in-memory and conventional database) according to particular needs, desires, or particular implementations of the computer 502 and the described functionality. Although illustrated as a single database 506 in FIG. 5, two or more databases of similar or differing types can be used according to particular needs, desires, or particular implementations of the computer 502 and the described functionality. While database 506 is illustrated as an integral component of the computer 502, in alternative implementations, database 506 can be external to the computer 502.

The computer 502 also includes a memory 507 that can hold data for the computer 502, another component or components communicatively linked to the network 530 (whether illustrated or not), or a combination of the computer 502 and another component. Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 5, two or more memories 507 or similar or differing types can be used according to particular needs, desires, or particular implementations of the computer 502 and the described functionality. While memory 507 is illustrated as an integral component of the computer 502, in alternative implementations, memory 507 can be external to the computer 502.

The application 508 is an algorithmic software engine providing functionality according to particular needs, desires, or particular implementations of the computer 502, particularly with respect to functionality described in the present disclosure. For example, application 508 can serve as one or more components, modules, or applications. Further, although illustrated as a single application 508, the application 508 can be implemented as multiple applications 508 on the computer 502. In addition, although illustrated as integral to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion or management circuits (including recharging, standby, or another power management functionality). In some implementations, the power-supply 514 can include a power plug to allow the computer 502 to be plugged into a wall socket or another power source to, for example, power the computer 502 or recharge a rechargeable battery.

There can be any number of computers 502 associated with, or external to, a computer system containing computer 502, each computer 502 communicating over network 530. Further, the term "client," "user," or other appropriate terminology can be used interchangeably, as appropriate, without departing from the scope of the present disclosure. Moreover, the present disclosure contemplates that many users can use one computer 502, or that one user can use multiple computers 502.

Described implementations of the subject matter can include one or more features, alone or in combination.

For example, in a first implementation, a computer-implemented method, comprising: adjusting a time of a first server in a distributed computing system to a target time; identifying, at the first server, a time offset between the target time and a time of a second server in the distributed computing system; and generating, by the first server, a computer instruction to the second server, wherein the computer instruction includes a time function modified by the time offset.

The foregoing and other described implementations can each, optionally, include one or more of the following features:

A first feature, combinable with any of the following features, wherein the first server is an application server.

A second feature, combinable with any of the previous or following features, wherein the second server is a database server.

A third feature, combinable with any of the previous or following features, wherein the computer instruction is a database operation instruction.

A fourth feature, combinable with any of the previous or following features, further comprising: selecting a third server in the distributed computing system as a time server; adjusting a time of the third server to the target time; and adjusting the time of the first server based on the time of the third server.

A fifth feature, combinable with any of the previous or following features, wherein the third server is an application server.

A sixth feature, combinable with any of the previous or following features, wherein the third server acquires the time of the second server, calculates the time offset between the target time and the time of the second server, and sends the time offset to the first server.

In a second implementation, a non-transitory, computer-readable medium storing one or more instructions executable by a computer system to perform operations comprising: adjusting a time of a first server in a distributed computing system to a target time; identifying, at the first server, a time offset between the target time and a time of a second server in the distributed computing system; and generating, by the first server, a computer instruction to the second server, wherein the computer instruction includes a time function modified by the time offset.

The foregoing and other described implementations can each, optionally, include one or more of the following features:

A first feature, combinable with any of the following features, wherein the first server is an application server.

A second feature, combinable with any of the previous or following features, wherein the second server is a database server.

A third feature, combinable with any of the previous or following features, wherein the computer instruction is a database operation instruction.

A fourth feature, combinable with any of the previous or following features, wherein the operations further comprise: selecting a third server in the distributed computing system as a time server; adjusting a time of the third server to the target time; and adjusting the time of the first server based on the time of the third server.

A fifth feature, combinable with any of the previous or following features, wherein the third server is an application server.

A sixth feature, combinable with any of the previous or following features, wherein the third server acquires the time of the second server, calculates the time offset between the target time and the time of the second server, and sends the time offset to the first server.

In a third implementation, A computer-implemented system, comprising: one or more computers; and one or more computer memory devices interoperably coupled with the one or more computers and having tangible, non-transitory, machine-readable media storing one or more instructions that, when executed by the one or more computers, perform operations comprising: adjusting a time of a first server in a distributed computing system to a target time; identifying, at the first server, a time offset between the target time and a time of a second server in the distributed computing system; and generating, by the first server, a computer instruction to the second server, wherein the computer instruction includes a time function modified by the time offset.

The foregoing and other described implementations can each, optionally, include one or more of the following features:

A first feature, combinable with any of the following features, wherein the first server is an application server, and the second server is a database server.

A second feature, combinable with any of the previous or following features, wherein the computer instruction is a database operation instruction.

A third feature, combinable with any of the previous or following features, wherein the operations further comprise: selecting a third server in the distributed computing system as a time server; adjusting a time of the third server to the target time; and adjusting the time of the first server based on the time of the third server.

A fourth feature, combinable with any of the previous or following features, wherein the third server is an application server.

A fifth feature, combinable with any of the previous or following features, wherein the third server acquires the time of the second server, calculates the time offset between the target time and the time of the second server, and sends the time offset to the first server.

An improvement on a technology may be obviously distinguished as an improvement on hardware (for example, an improvement on a circuit structure such as a diode, a transistor, and a switch) or an improvement on software (an improvement on a method procedure). However, with the development of technologies, improvements on many method procedures at present may be considered as direct improvements on hardware circuit structures. Almost all designers program the improved method procedures into hardware circuits to obtain corresponding hardware circuit structures. Therefore, it cannot be assumed that an improvement on a method procedure cannot be implemented by using a hardware entity module. For example, a Programmable Logic Device (PLD) (for example, a Field Programmable Gate Array (FPGA)) is such an integrated circuit, and logic functions thereof are determined by a user via programming its devices. Designers program by themselves to "integrate" a digital system into a piece of PLD, without inviting a chip manufacturer to design and manufacture a dedicated integrated circuit chip 2. Moreover, at present, the programming is mostly implemented by using "logic compiler" software, instead of manually manufacturing an integrated circuit chip. The software is similar to a software compiler used for developing and writing a program, and original code before compiling also needs to be written in a specific programming language, which is referred to as a Hardware Description Language (HDL). There are many types of HDLs, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, and RHDL (Ruby Hardware Description Language), among which VHDL (Very-High-Speed Integrated Circuit Hardware Description Language) and Verilog2 are most commonly used now. Those skilled in the art also should know that a hardware circuit for implementing the logic method procedure may be easily obtained only by slightly logically programming the method procedure using the above several hardware description languages and programming it into an integrated circuit.

A controller may be implemented in any suitable manner. For example, the controller may be in the form of, for example, a microprocessor or a processor and a computer readable medium storing computer readable program codes (for example, software or firmware) executable by the (micro)processor, a logic gate, a switch, an Application Specific Integrated Circuit (ASIC), a programmable logic controller, and an embedded micro-controller. Examples of the controller include, but are not limited to, the following micro-controllers: ARC 625D, Atmel AT91SAM, Microchip PIC18F26K20, and Silicone Labs C8051F320. A memory controller may also be implemented as a part of control logic of a memory.

Those skilled in the art also know that, in addition to implementing the controller by using pure computer readable program codes, the method steps may be logically programmed to enable the controller to implement the same function in the form of a logic gate, a switch, an application specific integrated circuit, a programmable logic controller and an embedded microcontroller. Therefore, such a controller may be considered as a hardware component, and apparatuses included therein and configured to implement various functions may also be considered as structures inside the hardware component. Alternatively, further, the apparatuses configured to implement various functions may be considered as both software modules for implementing the method and structures inside the hardware component. The system, apparatus, module or unit illustrated in this disclosure may specifically be implemented by using a computer chip or an entity, or a product having a certain function.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/− R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    determining, by an application server synchronization unit performing time synchronization with a time server in a distributed computing system, that time differences exist among servers in the distributed computing system due to hardware differences between the servers;
    adjusting a time of a first server in the distributed computing system to a target time;
    identifying, at the first server, a time offset between the target time and a time of a second server in the distributed computing system; and
    generating, by the first server, a computer instruction to the second server, wherein the computer instruction includes a time function modified by the time offset, and wherein the time function, when executed by the second server during a simulated service, synchronizes a service time recorded in a database of the second server with the target time without changing a database server time.

2. The computer-implemented method of claim 1, wherein the first server is an application server.

3. The computer-implemented method of claim 1, wherein the second server is a database server.

4. The computer-implemented method of claim 3, wherein the computer instruction is a database operation instruction.

5. The computer-implemented method of claim 1, further comprising:
    selecting a third server in the distributed computing system as the time server;
    adjusting a time of the third server to the target time; and
    adjusting the time of the first server based on the time of the third server.

6. The computer-implemented method of claim 5, wherein the third server is an application server.

7. The computer-implemented method of claim 5, wherein the third server acquires the time of the second server, calculates the time offset between the target time and the time of the second server, and sends the time offset to the first server.

8. A non-transitory, computer-readable medium storing one or more instructions executable by a computer system to perform operations comprising:
    determining, by an application server synchronization unit performing time synchronization with a time server in a distributed computing system, that time differences exist among servers in the distributed computing system due to hardware differences between the servers;
    adjusting a time of a first server in the distributed computing system to a target time;
    identifying, at the first server, a time offset between the target time and a time of a second server in the distributed computing system; and
    generating, by the first server, a computer instruction to the second server, wherein the computer instruction includes a time function modified by the time offset, and wherein the time function, when executed by the second server during a simulated service, synchronizes a service time recorded in a database of the second server with the target time without changing a database server time.

9. The non-transitory, computer-readable medium of claim 8, wherein the first server is an application server.

10. The non-transitory, computer-readable medium of claim 8, wherein the second server is a database server.

11. The non-transitory, computer-readable medium of claim 10, wherein the computer instruction is a database operation instruction.

12. The non-transitory, computer-readable medium of claim 8, wherein the operations further comprise:
    selecting a third server in the distributed computing system as the time server;
    adjusting a time of the third server to the target time; and
    adjusting the time of the first server based on the time of the third server.

13. The non-transitory, computer-readable medium of claim 12, wherein the third server is an application server.

14. The non-transitory, computer-readable medium of claim 12, wherein the third server acquires the time of the second server, calculates the time offset between the target time and the time of the second server, and sends the time offset to the first server.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:
determining, by an application server synchronization unit performing time synchronization with a time server in a distributed computing system, that time differences exist among servers in the distributed computing system due to hardware differences between the servers;
adjusting a time of a first server in the distributed computing system to a target time;
identifying, at the first server, a time offset between the target time and a time of a second server in the distributed computing system; and
generating, by the first server, a computer instruction to the second server, wherein the computer instruction includes a time function modified by the time offset, and wherein the time function, when executed by the second server during a simulated service, synchronizes a service time recorded in a database of the second server with the target time without changing a database server time.

16. The computer-implemented system of claim 15, wherein the first server is an application server, and the second server is a database server.

17. The computer-implemented system of claim 16, wherein the computer instruction is a database operation instruction.

18. The computer-implemented system of claim 15, wherein the operations further comprise:
selecting a third server in the distributed computing system as the time server;
adjusting a time of the third server to the target time; and
adjusting the time of the first server based on the time of the third server.

19. The computer-implemented system of claim 18, wherein the third server is an application server.

20. The computer-implemented system of claim 18, wherein the third server acquires the time of the second server, calculates the time offset between the target time and the time of the second server, and sends the time offset to the first server.

* * * * *